United States Patent [19]

Eisenberg

[11] Patent Number: 5,024,906

[45] Date of Patent: Jun. 18, 1991

[54] RECHARGEABLE ELECTROCHEMICAL CELL

[75] Inventor: Morris Eisenberg, Redwood City, Calif.

[73] Assignee: Electrochimica Corporation, Menlo Park, Calif.

[21] Appl. No.: 586,295

[22] Filed: Sep. 21, 1990

[51] Int. Cl.$^5$ .......................................... H01M 10/40
[52] U.S. Cl. ................................... 429/101; 429/197; 429/218
[58] Field of Search ............... 429/101, 194, 197, 196, 429/218, 220, 223, 222

[56] References Cited

U.S. PATENT DOCUMENTS

| | | | |
|---|---|---|---|
| 3,279,952 | 10/1966 | Minnick | 429/194 |
| 3,531,328 | 9/1970 | Bro et al. | 429/194 X |
| 3,578,500 | 5/1971 | Maricle et al. | 429/194 X |
| 4,403,021 | 9/1983 | Domeniconi et al. | 429/101 |
| 4,752,541 | 6/1988 | Faulkner et al. | 429/101 |

*Primary Examiner*—Anthony Skapars
*Attorney, Agent, or Firm*—Kennedy & Kennedy

[57] ABSTRACT

An ionizing solvent comprising sulfur dioxide and methyl chloroformate, ethyl chloroformate or sulfolane is added as a co-solvent in an electrolyte having a Lewis Acid salt of an active metal oxide of an electrochemical cell to increase cell performance and to prevent freezing.

6 Claims, No Drawings

RECHARGEABLE ELECTROCHEMICAL CELL

TECHNICAL FIELD

This invention relates to rechargeable electrochemical cells of the type that employ inorganic electrolytes based on complexes of Lewis Acid salts and sulfur dioxide.

BACKGROUND OF THE INVENTION

High energy electrochemical batteries employing alkaline or earth alkaline metals as the active material in the anode require the use of non-aqueous, aprotic solvents for the preparation of the electrolyte. Thus typically in lithium anode based primary and secondary batteries it has been traditional to employ aprotic solvents such as cyclic ethers or esters such as methyl tetrahydrofuran (MTHF) and propylene Carbonate (PC). Recently, a new class of totally inorganic electrolytes has been proposed by B. F. Koslowski in *X-Ray Investigations of Solvates of the type $MALCL_4/SO_2$*, Ph.D. Thesis, University of Hannover, Germany, 1989. This class is based on complexes of salts of Lewis Acids with sulfur dioxide. Prominent examples of these electrolytes are $LiAlCl_4.3SO_2$ all the way up to $LiAlCl_4.6SO_2$. These new inorganic electrolytes offer substantially higher conductivities of the order of 60 to 100 mS/cm compared to the typical values of 5-10 mS/cm obtained with organic solvents. These new electrolytic systems are more stable than organic electrolytes and less susceptible to side reactions during overcharge or overdischarge of a battery as it is being cycled.

This new class of electrolytes, because of its substantially greater conductivities and greater stability against electrochemical side reactions, offers new design and development possibilities for high energy batteries based on alkaline and earth alkaline earth anodes. Nevertheless, there exists several problems in their preparation, storage and use. Though the complex with $3SO_2$ is stable at 1 atmosphere and at room temperature when first prepared, within a short time in it has a tendency to freeze with a slight decrease in the $SO_2$ ratio, which typically is from 3.0 to 2.7. Once the electrolyte freezes there is a dramatic drop in cell conductance and the battery can no longer perform satisfactorily. This crystallization is readily seeded by the vessel walls and many metal and plastic materials in contact with the electrolyte as well as by the electrodes. It is only a matter of time when freezing occurs as it can happen within minutes, hours or weeks. If one goes up to higher contents of $SO_2$, and is able to control the high vapor pressure, for instance for $LiAlCl_4.6SO_2$, the freezing tendency is decreased, although not eliminated once the material is depressurized. Furthermore, working with pressurized electrolytes presents serious obstacles in electrolyte and battery preparation and storage.

SUMMARY OF THE INVENTION

It has now been discovered that small additions of certain organic and inorganic aprotic co-solvents to the $SO_2$ complex based electrolytes eliminates the freezing problem and allows one to remain close to the desirable ratio of $3SO_2$ thereby eliminating high vapor pressures and generally enhancing galvanic cell performance. Cathode capacity utilization is also improved by the co-solvents.

DETAILED DESCRIPTION

Example 1

A small galvanic cell was assembled using a cupric chloride ($CuCl_2$) cathode of the following composition:
85%* $CuCl_2$
11% carbon conductive additive
4% Teflon (PTFE) binder
*by weight The cathode material was pressed to a nickel screen at 2 tons/in$^2$. A cell was assembled in a sealed glass container using a glass mat and two layers of a microporous polypropylyne separator. The cathode, with a theoretical capacity of 170 mAH, was placed between two 0.7 inch by 0.8 inch lithium anodes with 3 fold excess capacity. An electrolyte was prepared of the composition $LiAlCl_4.3SO_2$ and used to fill the cell. The cell was discharged at 20 mA to a 2.0v cutoff. It delivered a 110 mAH capacity for a 64.7% yield of theoretical capacity. After 5 more charge/discharge cycles on the 6th day the cell failed due to a completely frozen, immobilized electrolyte.

Example 2

An otherwise identical cell as described in Example 1 was filled with an electrolyte consisting of
90%* $LiAlCl_4.3SO_2$
7% methyl chloroformate (MCF)
3% sulfolane (SL)
*by weight The cell delivered in 20 mA discharge 148 mAH for 87% of the theoretical cathode capacity. The cell operated for 5 months and performed 127 charge-discharge cycles with gradually decreasing capacity, but without ever freezing up.

Example 3

An otherwise identical cell as in Example 1 was filled with an electrolyte consisting of 97% $LiAlCl_4.3SO_2$ and 3% sulfolane (SL). It yielded 82% theoretical cathode capacity and cycled successfully for 210 cycles without ever freezing.

Example 4

An otherwise identical cell as in Example 1 but containing a pressed lithium/aluminum (LiAl) alloy instead of a pure lithium anode was assembled in a thick threaded Pyrex glass tube and filled, under pressure, with an electrolyte also prepared under an $SO_2$ pressure atmosphere. The electrolyte composition was:
88% $LiAlCl_2.6\,SO2$
10.5% ethyl chloroformate (ECF)
1.5% sulfolane (SL)

In a 20 mA discharge the cell delivered a capacity of 144 mAH or 85% of theoretical.

The cathode may contain a reducible metal halide such as the fluorides, chlorides, bromides and iodides of silver, copper, nickel and cobalt. The anode may contain metals other than the lithium, specifically sodium, potassium, beryllium, magnesium, calcium and aluminum. The electrolyte co-solvent may contain ethyl chloroformate instead of methyl chloroformate. Also, the salt-sulfur dioxide complex may be $LiAlCl_4.3SO_2$ to $6SO_2$, $LiAlF_4.3SO_2$ to $6SO_2$ or $LiGaCl_4.3SO_2$ to $6SO_2$.

Though the preferred form of the invention has been described in detail, it should be understood that numerous modifications may be made thereto without departure from the spirit and scope of the invention as set forth in the following claims.

I claim:

1. A non-aqueous, rechargeable electrochemical cell comprising:
   an active metal anode;
   a reducible metal halide cathode with a positive electrode current collector; and
   an electrolyte comprising a Lewis Acid salt of said active metal, an ionizing solvent comprising sulfur dioxide, and a co-solvent selected from the group consisting of methyl chloroformate (MCF), ethyl chloroformate (ECF) and sulfolane (SL).

2. The electrochemical cell of claim 1 wherein said anode comprises at least one metal selected from the group consisting of lithium, sodium, potassium, beryllium, magnesium, calcium and aluminum.

3. The electrochemical cell of claim 1 wherein said electrolyte ionizing solvent comprises sulfur dioxide complexed to the Lewis acid salt in a ratio range of 3 to 6 moles $SO_2$ to 1 mole of salt.

4. The electrochemical cell of claim 3 in which the salt-sulfur dioxide complex is selected from the group $LiAlCl_4.3SO_2$ to $6SO_2$, $LiAlF_4.3SO_2$ to $6SO_2$, $LiGaCl_4.3SO_2$ to $6 SO_2$.

5. The electrochemical cell of claim 4 in which the cathode contains a reducible metal halide such as the fluorides, chlorides, bromides and iodides of silver, copper, nickel and cobalt.

6. The electrochemical cell of claim 6 in which the active reducible cathode material is a chloride selected from the group consisting of cupric chloride, cuprous chloride and nickel chloride.

* * * * *